(12) United States Patent
Akif et al.

(10) Patent No.: US 12,060,032 B2
(45) Date of Patent: Aug. 13, 2024

(54) PEDESTRIAN PROTECTION DEVICE FOR A MOTOR VEHICLE

(71) Applicant: Bayerische Motoren Werke Aktiengesellschaft, Munich (DE)

(72) Inventors: Oeztzan Akif, Munich (DE); Majid Hojjat, Munich (DE); Arne Koehler, Pliening (DE); Roland Lang, Asbach-Baeumenheim (DE); Theodor Meinerling, Hohenwart (DE); Lin Moellenhoff, Odelzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 15 days.

(21) Appl. No.: 17/773,878

(22) PCT Filed: Dec. 14, 2020

(86) PCT No.: PCT/EP2020/086049
§ 371 (c)(1),
(2) Date: May 3, 2022

(87) PCT Pub. No.: WO2021/122486
PCT Pub. Date: Jun. 24, 2021

(65) Prior Publication Data
US 2022/0363216 A1 Nov. 17, 2022

(30) Foreign Application Priority Data
Dec. 19, 2019 (DE) ..................... 10 2019 135 201.0

(51) Int. Cl.
*B60R 21/34* (2011.01)
*B60R 19/18* (2006.01)
*B60R 21/0136* (2006.01)

(52) U.S. Cl.
CPC .............. *B60R 21/34* (2013.01); *B60R 19/18* (2013.01); *B60R 21/0136* (2013.01); *B60R 2019/1873* (2013.01); *B60R 2021/343* (2013.01)

(58) Field of Classification Search
CPC ..... B60R 21/34; B60R 19/18; B60R 21/0136; B60R 2019/1873; B60R 2021/343
See application file for complete search history.

(56) References Cited

U.S. PATENT DOCUMENTS 6,145,921 A 11/2000 Cho
6,485,072 B1 * 11/2002 Werner ................... B60R 19/34
296/187.05

(Continued)

FOREIGN PATENT DOCUMENTS

CN 202294634 U 7/2012
CN 102695631 A 9/2012

(Continued)

OTHER PUBLICATIONS

German-language Search Report issued in German Application No. 10 2019 135 201.0 dated Aug. 4, 2020 with partial English translation (14 pages).

(Continued)

*Primary Examiner* — Toan C To
(74) *Attorney, Agent, or Firm* — Crowell & Moring LLP

(57) ABSTRACT

A pedestrian protection device for a motor vehicle includes a crossbar and a deformation device which is arranged in front of the crossbar. The deformation device has bending limbs with ends which contact a surface or come into contact with the surface in the event of a collision of the motor vehicle and which are designed to be movable along the surface as a result of the collision, and a latching device is formed on the surface, said latching device being latchable with the ends of the bending limbs as a result of the collision.

(Continued)

The deformation device has a plurality of such bending limbs, wherein a first bending limb and a second bending limb are arranged adjacently to each other, and the first bending limb and the second bending limb are offset relative to each other in the movement direction of the bending limbs and/or the end of the first bending limb and the end of the second bending limb are designed to be movable in opposite directions.

14 Claims, 2 Drawing Sheets

(56) References Cited

U.S. PATENT DOCUMENTS

| | | | |
|---|---|---|---|
| 6,554,332 | B1 | 4/2003 | Schuster et al. |
| 6,575,510 | B2* | 6/2003 | Weissenborn .......... B60R 19/18 293/121 |
| 6,866,313 | B2* | 3/2005 | Mooijman .............. B60R 19/18 293/121 |
| 6,874,832 | B2* | 4/2005 | Evans .................... B60R 19/18 293/121 |
| 6,971,690 | B2* | 12/2005 | Evans .................... B60R 19/18 293/120 |
| 7,240,959 | B2* | 7/2007 | Urushiyama .......... B60R 19/18 296/187.03 |
| 8,157,066 | B2* | 4/2012 | Murayama ............. B60R 19/18 188/371 |
| 9,193,319 | B2* | 11/2015 | Kutscher ................... F16F 7/12 |
| 9,457,762 | B2* | 10/2016 | Jayasuriya .......... B60R 21/0136 |
| 9,731,669 | B2* | 8/2017 | Nagwanshi ............. B60R 19/18 |
| 10,000,170 | B2* | 6/2018 | Nilsson .................... B60R 19/18 |
| 10,710,529 | B2* | 7/2020 | Akif ......................... F16F 7/12 |
| 11,505,147 | B2* | 11/2022 | Schiller .................... B60R 19/12 |
| 2002/0125707 | A1 | 9/2002 | Knoethig et al. |
| 2010/0133859 | A1* | 6/2010 | Lutke-Bexten ......... B60R 19/18 293/102 |
| 2011/0109105 | A1* | 5/2011 | Ralston ................... B60R 19/18 293/132 |
| 2011/0309653 | A1 | 12/2011 | Schuler et al. |
| 2012/0032458 | A1 | 2/2012 | Brooks et al. |
| 2012/0286529 | A1 | 11/2012 | Gukkenberger et al. |
| 2012/0306221 | A1 | 12/2012 | Tsuyuzaki et al. |
| 2015/0274118 | A1 | 10/2015 | Schondorf et al. |
| 2018/0272971 | A1 | 9/2018 | Syvertsen et al. |
| 2018/0272986 | A1 | 9/2018 | Sipido et al. |
| 2018/0281713 | A1 | 10/2018 | Akif et al. |

FOREIGN PATENT DOCUMENTS

| | | |
|---|---|---|
| CN | 107000665 A | 8/2017 |
| CN | 207311338 U | 5/2018 |
| CN | 108349453 A | 7/2018 |
| CN | 108367728 A | 8/2018 |
| DE | 24 18 459 A1 | 10/1975 |
| DE | 198 25 040 A1 | 3/1999 |
| DE | 198 58 299 A1 | 6/2001 |
| DE | 103 52 629 A1 | 6/2004 |
| DE | 20 2009 016 759 U1 | 5/2010 |
| DE | 10 2008 063 538 A1 | 6/2010 |
| DE | 10 2009 025 209 A1 | 12/2010 |
| DE | 10 2011 009 943 A1 | 8/2011 |
| DE | 10 2010 054 641 A1 | 6/2012 |
| DE | 10 2012 112 636 A1 | 7/2014 |
| DE | 10 2015 104 267 A1 | 10/2015 |
| DE | 10 2015 210 191 A1 | 1/2016 |
| DE | 10 2015 224 457 A1 | 6/2017 |
| DE | 10 2016 216 048 A1 | 3/2018 |
| JP | 2016-165977 A | 9/2018 |
| RU | 2 243 910 C1 | 1/2005 |
| WO | WO 2012/140151 A1 | 10/2012 |
| WO | WO 2013/131629 A1 | 9/2013 |

OTHER PUBLICATIONS

International Search Report (PCT/ISA/210) issued in PCT Application No. PCT/EP2020/086049 dated Feb. 18, 2021 with English translation (four (4) pages).
Written Opinion (PCT/ISA/237) issued in PCT Application No. PCT/EP2020/086049 dated Feb. 18, 2021 (five (5) pages).
English translation of Chinese-language Office Action issued in Chinese Application No. 202080073757.7 dated Jun. 1, 2023 (8 pages).

* cited by examiner

PEDESTRIAN PROTECTION DEVICE FOR A MOTOR VEHICLE

BACKGROUND AND SUMMARY

The present invention relates to a pedestrian protection device for a motor vehicle, comprising a crossmember, in particular a bumper crossmember, and a deformation device, which is arranged in front of the crossmember. A pedestrian protection device of this type is shown in DE 102015224457 A1.

A known front end of a motor vehicle has, for example, a bumper crossmember which is fastened to front ends of longitudinal members or crash boxes, and a bumper cladding. A foam which is deformable at a comparatively low load level is arranged between the bumper cladding and the bumper crossmember in order to protect pedestrians. By this means, in the event of a collision of the motor vehicle with a pedestrian, the pedestrian is protected against direct and immediate collision with a stiff structure, such as the bumper crossmember, located there behind. The deformable foam has an effect in respect of pedestrian protection in particular within a certain speed range, such as, for example, 20 to 50 km/h.

Furthermore, it is required for the motor vehicle to remain free from damage in a collision in a very low speed range of up to, for example, 4 km/h, in which the pedestrian protection is irrelevant because of the low speed.

Furthermore, at a somewhat higher speed, for example less than 20 km/h, which is likewise still not relevant for pedestrian protection, it is required that damage during the collision is as small as possible and, for example, a radiator structure which is located in the front end region is not damaged.

In the event of a collision at a comparatively high speed which is no longer relevant for pedestrian protection, a focus is on the design of the motor vehicle and a crash structure thereof for occupant protection. For this purpose, the front end or vehicle front is designed in such a manner that it is deformed in an energy-absorbing manner over a certain deformation distance.

However, the requirements imposed on pedestrian protection are partially contradictory with the requirements at lower or higher speeds. This contradiction can, however, basically be solved by a comparatively long vehicle overhang. However, the long vehicle overhang leads to a greater overall length of the vehicle and also to a higher weight of the vehicle. Furthermore, driving dynamics of the vehicle are disadvantageously affected by the long vehicle overhang.

In order to solve the resulting conflicts of objectives, a bumper arrangement with a crossmember which is fastened to the vehicle body via crash boxes has been proposed, for example, in DE 02010054641 A1. A pedestrian protection element for a soft impact of a pedestrian is formed in front of the crossmember in the direction of travel. In addition, a pivotable energy absorption element is provided which is pivotable in front of the pedestrian protection element and thereby permits increased energy absorption in collisions in which a higher collision energy absorption capability of the crash structure of the motor vehicle is required.

DE 02012112636 A1 likewise shows a bumper arrangement, comprising a bumper crossmember and a pedestrian protection element which can be switched over by means of an actuator from a stiff state into a comparatively soft state which serves for pedestrian protection.

A common feature of the bumper arrangements described in DE 02010054641 A1 and DE 02012112636 A1 is that a crash or pre-crash sensor system is required for this purpose, wherein, on the basis of the output signals of the sensor system, a switch can be made between a hard, stiff state of the crash structure with high collision energy absorption capability and a soft state of the crash structure with low collision energy absorption capability for the benefit of pedestrian protection.

It is the object of the present invention to provide a pedestrian protection device comprising a bumper crossmember and a deformation device, which is arranged in front of the bumper crossmember, which pedestrian protection device is constructed in a simple manner and is switchable between different rigidities and/or strengths independently of a sensor system or an actuator, wherein the pedestrian protection device can be produced and can be mounted in a simple manner and the effect thereof is improved.

This object is achieved by a pedestrian protection device for a motor vehicle which has the features of the independent claim. Advantageous refinements of the invention are referred to in the dependent patent claims.

The pedestrian protection device according to the invention for a motor vehicle, in particular for a passenger motor vehicle, has a crossmember, in particular a bumper crossmember, for example a front bumper crossmember, and a deformation device, which is arranged in front of the crossmember. The deformation device has bending limbs, the ends of which lie against a surface or, in the event of a collision of the motor vehicle, come to bear against the surface. The ends of the bending limbs are designed to be displaceable along the surface as a result of the collision, wherein the surface bears a latching device with which the ends of the bending limbs can be latched as a result of the collision. According to the invention, a first bending limb and a second bending limb are arranged adjacent to each other, in particular adjoining each other. The first bending limb and the second bending limb are arranged offset with respect to each other in the displacement direction of the bending limbs. Alternatively or additionally, the end of the first bending limb and the end of the second bending limb are formed displaceably in opposite directions.

According to the present invention, it is therefore possible for a rigidity of the deformation device to be increased by the bending limb latching into place during deformation of the deformation element as a result of the collision, without a collision sensor system or an actuator system being required here. The collision load itself therefore brings about a stiffening of the deformation element. By means of the arrangement of two bending limbs adjacent to each other and by means of the offset arrangement, a deformation action of the deformation device can be implemented over a relatively large region of the pedestrian protection device.

The term latchable into place is used in the sense of a form-fitting engagement of the ends of the bending limbs with the latching device.

Within the context of the invention, the term pedestrian also includes other traffic participants or non-occupants, for example cyclists. Accordingly, the device could also be called a non-occupant protection device.

The ends of the bending limbs are in particular free ends of the bending limbs.

The specification "in front of the crossmember" means in particular that the deformation device is arranged on an outer side of the crossmember, i.e. a side of the crossmember that faces an outer skin of the body, for example in the form of a bumper cladding. Furthermore, the outer side of the crossmember can be the side which faces the direction from which a collision load can be anticipated.

According to a preferred embodiment, the first bending limb and the second bending limb have substantially an identical shape.

This is functionally advantageous insofar as substantially identical bending limbs have a substantially identical function. The function of the deformation device and/or of the pedestrian protection device can therefore be realized in a similar manner over a relatively large region.

The first bending limb and the second bending limb can also have a different shape. An asymmetrical effect of the deformation device is thereby possible.

According to a preferred development of the invention, a plurality of bending limbs can be formed integrally with one another.

This simplifies the manufacturing of the deformation device.

The bending limbs can advantageously be formed from a deformed sheet.

The bending limbs can thereby be produced particularly cost-effectively.

In an advantageous manner, a multiplicity of bending limbs are arranged adjacent to one another, in particular spaced apart from one another or directly adjoining one another.

According to a development of the present invention, the deformation device of the pedestrian protection device has a first deformation element with a multiplicity of first bending limbs and a second deformation element with a multiplicity of second bending limbs, wherein the first bending limbs and the second bending limbs in particular mesh together. In other words, the first bending limbs and the second bending limbs mutually alternate.

According to a further preferred development, the pedestrian protection device furthermore has a sensor device for detecting a collision with, for example, a pedestrian. The pedestrian protection device is advantageously adapted here in such a manner that it initiates active pedestrian protection measures on the basis of the detection of the collision. Active pedestrian protection measures are, for example, raising of a front hood or inflation of an airbag.

The sensor device can be arranged on a base or a holder which is arranged or fastened on or to the crossmember. The sensor device is preferably arranged in an intermediate space between the bending limbs and the crossmember.

The base can be composed of a foam material.

The base can thereby be of sufficiently lightweight design.

Furthermore, the base has preferably been designed or arranged in such a manner that it is deformable at a low force level.

By this means, the sensor device can detect the collision more easily or with greater accuracy.

The sensor device is preferably composed of a deformable, gas-filled tube and a pressure measurement device for measuring the pressure of the gas in the tube.

According to a preferred development, the bending limbs, the ends of the bending limbs, the surface and the latching device are designed in an interacting manner such that, in the event of a collision impulse which is smaller than a predetermined collision impulse, the ends of the bending limbs latch with the latching device, and that, in the event of a collision impulse which is equal to or greater than the predetermined collision impulse, the ends of the bending limbs do not latch with the latching device and are displaceable further. In the latter case, the ends of the bending limbs pass or jump over the latching device and are therefore displaceable further. In particular, in the latter case, the ends of the bending limbs can be displaceable or shiftable further along the surface.

Therefore, with simple means and using the collision impulse, the deformation device can have a less stiff, soft state, in which the bending limb or the end of the bending limb is not latched into place, or a stiffer, hard state, in which the end of the bending limb is latched into place, depending on the collision impulse.

According to a preferred development of the pedestrian protection device, in the event of the collision, when the front ends of the bending limbs are latched with the latching device, the deformation device is deformable at a higher force level or undergoes brittle failure at a higher force level, and, when the front ends of the bending limbs are not latched with the latching device, the deformation device is deformable at a lower force level or the deformation device undergoes brittle failure at a lower force level.

Preferably, the first bending limb and/or the second bending limb are or is of substantially arcuate and/or U-shaped design.

Furthermore, the latching devices are depressions, in particular grooves, in which the ends of the bending limbs can be engaged in a form-fitting manner.

Therefore, with simple means and using the collision impulse, the deformation element can have a less stiff, soft state, in which the bending limb or the end of the bending limb is not latched into place, or a stiffer, hard state, in which the end of the bending limb is latched into place, depending on the collision impulse.

The surface is preferably arranged substantially transversely with respect to a (main) collision direction or a longitudinal direction of the vehicle or at least parallel to a vertical direction of the vehicle. In particular, the surface can be arranged substantially transversely with respect to a main driving direction of the vehicle. As an alternative definition, the displacement direction of the end of the bending limb runs transversely, preferably substantially perpendicularly, with respect to a collision direction. The collision direction is the direction from which a collision load from a collision counterpart should be expected.

The surface can be a flat surface. However, the surface can also have a different shape. For example, the surface can have a step in the region of the latching device. The surface can also be corrugated in a suitable manner.

Furthermore, the surface can have an activation slope at a point between the ends of the bending limbs and the latching device, the activation slope supporting the ends of the bending limbs here in that, from the predetermined collision impulse, the ends jump over the latching device and permit deformation of the deformation element at a low load level.

The surface can be formed on the crossmember or a part mounted on the crossmember. The surface can be, for example, part of the crossmember. In particular, the surface can be formed in a closing plate of a profiled crossmember.

The deformation device can have a length of 50 to 150 mm, preferably 70 to 110 mm, in the collision direction and/or in the longitudinal direction.

This length is relevant in particular for pedestrian protection.

The abovementioned developments of the inventions can be combined as desired with one another insofar as possible and expedient.

A brief description of the figures follows.

DETAILED DESCRIPTION OF THE DRAWINGS

An exemplary embodiment of the present invention is described below with reference to FIGS. 1 to 4.

Figure 1:
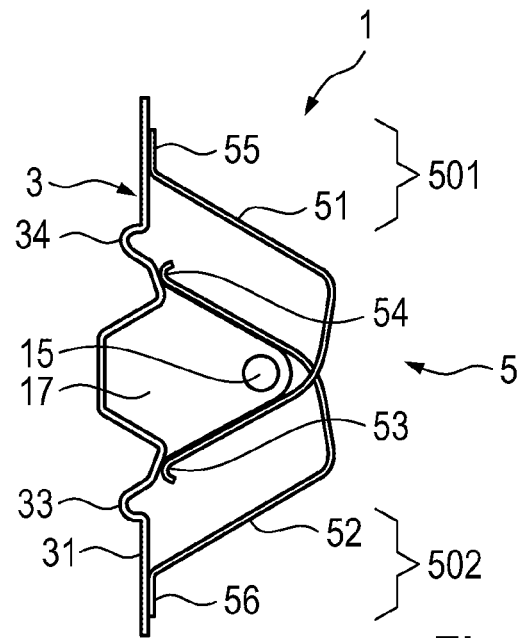
FIG. 1 is a schematic sectioned side view of a pedestrian protection device according to an exemplary embodiment of the present invention.
Figure 2:
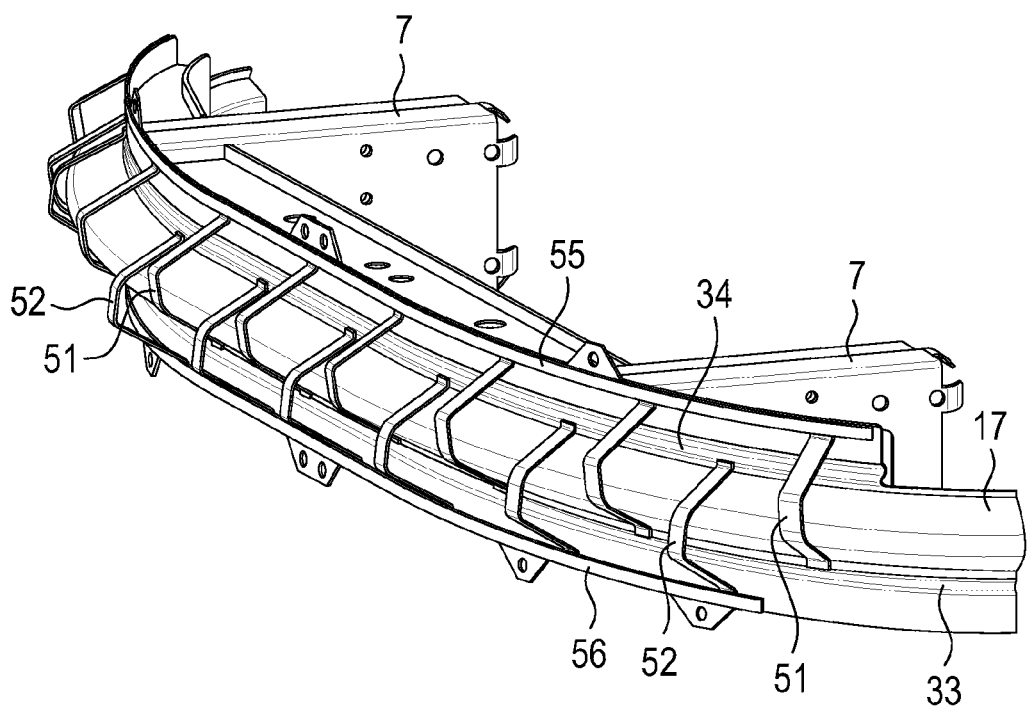
FIG. 2 is a schematic perspective view of the pedestrian protection device according to the exemplary embodiment of the present invention.

As is shown in the schematic sectional view in FIG. 1, a pedestrian protection device 1 of a motor vehicle, in particular a passenger motor vehicle, has, according to the exemplary embodiment of the present invention, a front bumper crossmember 3 and a deformation device 5, which is arranged in front of the front bumper crossmember 3 and is fastened thereto. A surface 31 directed substantially forward or outward is formed on the front bumper crossmember 3. The surface 31 is formed substantially parallel to a vertical direction of the vehicle and is formed mainly perpendicularly to a longitudinal direction of the vehicle, wherein the bumper crossmember 3 together with the surface 31 can also be bent somewhat rearward at its end portions, as shown in FIG. 2, and therefore the surface 31 in particular in this region cannot be formed perpendicularly to the longitudinal direction of the vehicle. A latching device or depression in the form of grooves 33, 34 is formed in the surface 31. The surface 31 is formed on a front closing plate of the bumper crossmember 3.

The deformation device 5 has a plurality of bending limbs 51, 52, the front ends 53, 54 of which are in contact with the surface 31, wherein two adjacent bending limbs 51 and 52 are shown in FIG. 1. The deformation device 5 is suitably connected to the bumper crossmember 3 in a form-fitting, integrally bonded or/and frictionally locking manner. FIG. 1 shows the bending limb 51, wherein the adjacent bending limb 52 is arranged substantially mirror-inverted and offset downward in the vertical direction with respect to the bending limb 51 which is shown. The region of the bending limb 51 on which the front end 53 is formed lies against a downwardly directed side of a base 17 of a sensor in the starting position which is shown. In an analogous manner, the region of the bending limb 52 on which the front end 54 is formed lies against an upwardly directed side of the base 17 of the sensor in the starting position which is shown.

As is shown in FIG. 2, the deformation device 5 runs over an entire width of the bumper crossmember 3. The bumper crossmember 3 is fastened to the vehicle body via crash boxes 7 on a left longitudinal member and a right longitudinal member, which are not shown in FIG. 2. The surface 31 and the grooves 33, 34 likewise extend over an entire width of the bumper crossmember 3.

As is furthermore shown in FIGS. 1 and 2, the deformation device 5 has an upper portion 501 with bending limbs 51 and a lower portion 502 with bending limbs 52. The upper portion 501 has a strip 55 from which the bending limbs 51 extend downward and forward. The strip 55 and the bending limbs 51 are formed integrally with one another from a deformed sheet. The bending limbs 51 are arranged spaced apart from one another and are correspondingly punched out of the deformed sheet. The strip 55 is suitably fastened to an upper region of the bumper crossmember 3 or the surface 31. The lower portion 502 has a strip 56 from which the bending limbs 52 extend upward and forward. The strip 56 and the bending limbs 52 are formed integrally with one another from a deformed sheet. The bending limbs 52 are arranged spaced apart from one another and are correspondingly punched out of the sheet. The strip 56 is suitably fastened to a lower region of the bumper crossmember 3 or the surface 31. The upper portion 501 of the deformation device 5 and the lower portion 502 of the deformation device 5 are arranged in such a manner that the bending limbs 51 and the bending limbs 52 mesh together such that the bending limbs 51 and 52 mutually alternate and a bending limb 51 is always formed adjacent to a bending limb 52. In FIG. 2, the bending limbs 51 and the bending limbs 52 are arranged spaced apart from each other, but they may also directly adjoin one another. The bending limbs 51 and 52 are arranged offset with respect to each other in the vertical direction of the vehicle and overlap in the transverse direction in a central region on the bumper crossmember 3, as can clearly be seen in particular in FIG. 1.

The bumper protection device 1 according to the present exemplary embodiment furthermore has the sensor which is designed for detecting a collision of the motor vehicle, in particular with a pedestrian. The sensor consists of an air-filled, deformable tube 15. Furthermore, a pressure sensor is provided for detecting an air pressure within the tube. Due to a pressure change within the tube, caused by a sudden deformation of the tube 15, a control device can draw conclusions regarding a collision and can initiate pedestrian protection measures, such as raising a front hood or triggering a pedestrian protection airbag. The tube 15 runs substantially over an entire width of the bumper crossmember 3. The tube 15 is arranged in the base 17. The base 17 is fastened to the bumper crossmember 3 and extends substantially over an entire width of the bumper crossmember 3 between the bending limbs 51 and 52 and the bumper crossmember 3. The base 17 is composed of a lightweight foam material and surrounds the tube 15 substantially completely. As can be seen in particular in FIG. 1, the base 17 in cross-section substantially has the shape of an isosceles triangle, wherein the tube 15 is arranged at a front end of the base 17, i.e. in the region of the tip of the triangle.

A function of the pedestrian protection device 1 and a differing rigidity behavior of the pedestrian protection device 1 are described below with reference to FIGS. 3 and 4.

In the event of a collision, in particular a head-on collision of the motor vehicle, in which a load acts substantially in the longitudinal direction of the vehicle, the deformation device 5 is stressed in the direction of the bumper crossmember 3. In other words, the deformation device 5 is pressed in the collision direction, see the direction arrows in FIGS. 3 and 4, toward the bumper crossmember 3. As a result, the bending limbs 51, 52, in particular the ends 53, 54 of the bending limbs 51, 52, are pressed, in the present case downward or upward, along the surface 31 transversely with respect to the bumper crossmember 3, while the deformation device 5 is compressed or deformed. During the collision, the ends 53, 54 of the bending limbs 51, 52 are therefore moved transversely with respect to the bumper crossmember 3 or the surface 31 on the bumper crossmember 3.

Figure 3:
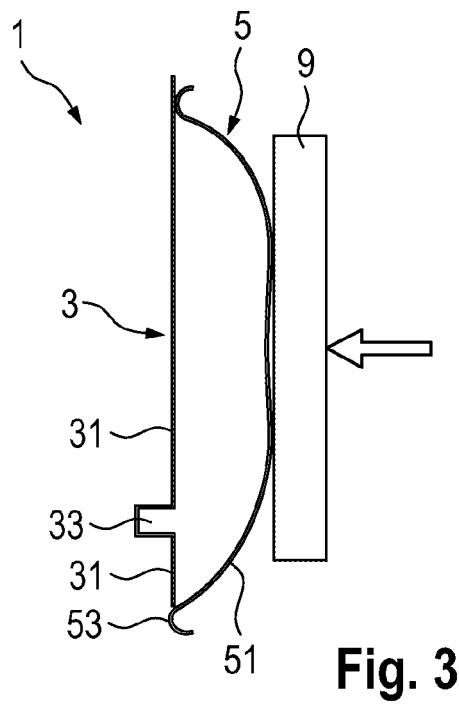
FIG. 3 is a schematic sectioned side view of the pedestrian protection device according to the exemplary embodiment of the present invention in the event of a collision with a high collision impulse.

FIG. 3 shows a head-on collision of the motor vehicle with a pedestrian and a corresponding deformation of the deformation device 5 at a speed within a range of approximately 20 km/h to approximately 50 km/h or a correspondingly high collision impulse. The deformation device 5 and the bumper crossmember 3 are configured in an interacting manner such that, in this head-on collision of the motor vehicle with the pedestrian at the speed of above 20 km/h, i.e. with a collision impulse above a collision impulse threshold value, the ends 53, 54 of the bending limbs 51, 52 slide along the surface 31 and then jump over the associated grooves 33, 34 and therefore do not latch into place in these grooves 33, 34. After jumping over the associated grooves 33, 34, the ends 53, 54 of the bending limbs 51, 52 can slide further along the surface 31 while the collision load continues to press the bending limbs 51, 52 affected by the collision load further in the direction of the bumper crossmember 3 or the surface 31 and correspondingly deforms the bending limbs.

A load (force) at which the deformation device 5 is deformed here is relatively low because of the lack of an engagement/latching into place of the bending limbs 51, 52 or of the ends 53, 54 of the bending limbs 51, 52 in the groove 33 or 34. The deformation device 5 can therefore meet the requirements of pedestrian protection within a speed range of approximately, for example, 20 to 50 km/h.

Figure 4:
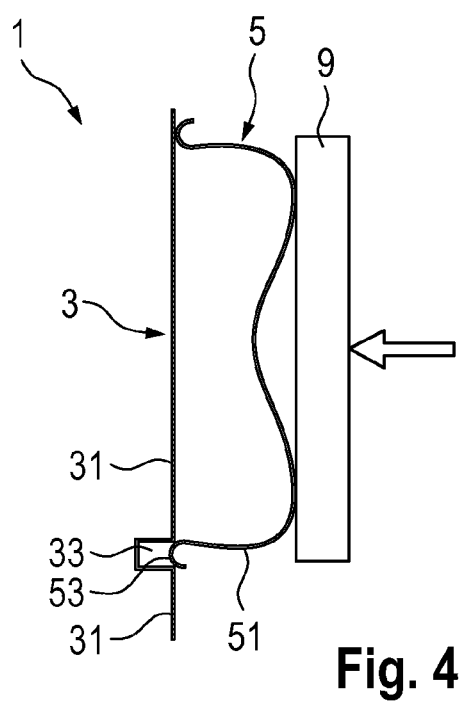
FIG. 4 is a schematic sectioned side view of the pedestrian protection device according to the exemplary embodiment of the present invention in the event of a collision with a low collision impulse.

During the deformation of the deformation device 5, the bending limbs 51, 52 moving in the direction of the bumper crossmember 3 soon strike against the base 17, not illustrated in FIGS. 3 and 4 for the sake of simplicity, with the tube 15 accommodated therein, and therefore the sensor device detects the collision, and pedestrian protection measures can then be initiated. In the process, the base 17 is compressed at a very low force level and pressed into the abovementioned depression in the surface 31 or in the closing plate of the bumper crossmember such that the bending limbs 51, 52 can be bent at a low force level until they are in contact with the surface 31.

FIG. 4 shows a head-on collision of the motor vehicle in the case in which the motor vehicle collides at a lower speed, i.e. at a speed of less than 20 km/h, in particular at less than 4 or 5 km/h, i.e. what is referred to as low-speed crash, wherein this low speed is less relevant for pedestrian protection. In a manner corresponding to the lower speed, the collision impulse here is lower, and therefore, in the event of a deformation of the deformation device 5 as a result of the collision load, the front ends 53, 54 of the bending limbs 51, 52 do not jump over the grooves 33, 34, but rather latch into place in a form-fitting manner in the associated grooves 33, 34. The deformation device 5 is configured in such a manner that deformation of the deformation device 5 in the collision direction, i.e. toward the bumper crossmember 3, is thereby made significantly more difficult and therefore the deformation of the deformation device 5 either substantially does not take place at all (what is referred to as low-speed crash) or takes place at a substantially higher force level because of the form-fitting engagement of the deformation device 5 in the grooves 33, 34 (a deformation of the bending limb 51, 52 can already be seen in FIG. 4 after engagement in the groove 33, 34). The deformation device 5 can sufficiently absorb collision energy here by means of deformation and optionally brittle failure, and therefore motor vehicle elements arranged behind the bumper crossmember 3, such as, for example, a radiator, are not damaged. An outlay on repair in the event of collisions at low speeds is therefore kept low.

If the collision impulse is sufficiently low, the deformation device 5 deforms only to a small extent, if at all, within the scope of the form-fitting engagement of the deformation device 5 with the grooves 33, 34. The front ends 53, 54 of the bending limbs 51 and 52, respectively, are shifted into the groove, wherein then initially (depending on the load) no further movement of the bending limbs takes place. The distance between the front end of the base 17 and the front ends of the bending limbs 51, 52 means that the front ends of the bending limbs 51, 52 do not come into contact with the base 17, and therefore the tube 15 is not deformed and thus the sensor does not detect any collision. This is advantageous at what is referred to as the low-speed crash of up to approximately 4 or 5 km/h, for example what is referred to as a parking prang or a slight rear-end collision in this speed range. In this case, no collision is detected by the sensor since none of the bending limbs 51, 52 strikes against the base 17 with the tube and, accordingly, no unnecessary pedestrian protection measures are taken. Furthermore, the collision impulse is also low enough when the motor vehicle collides with a collision counterpart with a small mass even at higher speeds that customarily require pedestrian protection measures in the event of a collision with a pedestrian. A collision counterpart of this type could be a small animal which has a significantly smaller mass than a pedestrian. Accordingly, in this case, even if the vehicle is moving in a speed range which is relevant for pedestrian protection, no collision is detected and, accordingly, no unnecessary pedestrian protection measures are initiated.

FIGS. 3 and 4 describe the functional principal of just one bending limb 51, 52. In the event of the collision or the admission of load, the front ends 53, 54 of the bending limbs 51, 52 move in opposite directions, i.e. the front ends 53 of the bending limbs 51 move downward in one direction and the front ends 54 of the bending limbs 52 move upward. Furthermore, the bending limbs 51 and 52 are arranged offset with respect to each other in the vertical direction of the vehicle. Overall, the advantageous effect of the deformation device 5 is therefore distributed over a greater region of the vehicle front or of the bumper crossmember 3. In other words, the deformation device 5 can still have an adequate effect even if a collision load does not act on the bumper crossmember from an ideal direction in accordance with a collision load model, but rather is offset with respect to this ideal direction or may act somewhat obliquely with respect to this ideal direction.

What is claimed is:

1. A pedestrian protection device for a motor vehicle, comprising:
   a crossmember;
   a deformation device arranged in front of the crossmember, wherein
   the deformation device has a plurality of bending limbs, ends of which lie against a surface or, in an event of a collision of the motor vehicle, come to bear against the surface,
   the ends of the bending limbs are configured to be displaceable along the surface as a result of the collision; and
   a latching device, to which the ends of the bending limbs are latchable as a result of the collision, formed on the surface, wherein a first bending limb and a second bending limb are arranged adjacent to each other, and wherein at least one of:
   the first bending limb and the second bending limb are arranged offset with respect to each other in a displacement direction of the bending limbs, or the end of the first bending limb and the end of the second bending limb are displaceable in opposite directions.

2. The pedestrian protection device according to claim 1, wherein
the first bending limb and the second bending limb have a substantially identical shape.

3. The pedestrian protection device according to claim 1, wherein
multiple bending limbs are formed or connected integrally to one another.

4. The pedestrian protection device according to claim 1, wherein
the multiple bending limbs are formed from a deformed sheet.

5. The pedestrian protection device according to claim 1, wherein
multiple bending limbs are arranged adjacent to one another either spaced apart or directly adjoining one another.

6. The pedestrian protection device according to claim 1, wherein
the deformation device has a first deformation element with a multiplicity of first bending limbs and a second deformation element with a multiplicity of second bending limbs, and
the first bending limbs and the second bending limbs mesh with one another.

7. The pedestrian protection device according to claim 1, further comprising:
a sensor for detecting a collision in order to initiate active protection measures.

8. The pedestrian protection device according to claim 7, wherein
the sensor is arranged on a base which is arranged on the crossmember, and
the sensor is arranged between the bending limbs and the crossmember.

9. The pedestrian protection device according to claim 8, wherein
the base is deformable at a low force level and is composed of a foam.

10. The pedestrian protection device according to claim 7, wherein
the sensor is composed of a deformable, gas-filled tube and of a pressure measurement device for measuring a pressure of gas in the tube.

11. The pedestrian protection device according to claim 1, wherein
the bending limbs, the ends of the bending limbs, the surface, and the latching device are configured in an interacting manner such that, in an event of a collision impulse which is smaller than a predetermined collision impulse, the ends of the bending limbs latch with the latching device and, in an event of a collision impulse which is equal to or greater than the predetermined collision impulse, the ends of the bending limbs do not latch with the latching device and are displaceable to a further extent.

12. The pedestrian protection device according to claim 11, wherein
in the event of the collision, when the front ends of the bending limbs are latched with the latching device, the deformation device is deformable at a higher force level or undergoes brittle failure, and when the front ends of the bending limbs are not latched with the latching device, the deformation device is deformable at a lower force level or undergoes brittle failure.

13. The pedestrian protection device according to claim 1, wherein
the first bending limb and/or the second bending limb are/is of substantially arcuate and/or U-shaped design.

14. The pedestrian protection device according to claim 1, wherein
the latching device comprises depressions in which the ends of the bending limbs are engageable in a form-fitting manner.

* * * * *